(12) United States Patent
Martin

(10) Patent No.: US 6,739,617 B1
(45) Date of Patent: May 25, 2004

(54) EXPANDABLE TRAILER

(76) Inventor: Arne L. Martin, 4755 Austin Hwy., Fallon, NV (US) 89406

( * ) Notice: Subject to any disclaimer, the term of this patent is extended or adjusted under 35 U.S.C. 154(b) by 2 days.

(21) Appl. No.: 10/173,274

(22) Filed: Jun. 14, 2002

(51) Int. Cl.[7] .............................................. B62B 1/00
(52) U.S. Cl. ........................ 280/656; 280/789; 296/169
(58) Field of Search .................................. 280/656, 651, 280/639, 659, 47.34, 47.371, 37, 40, 87.01, 789; 296/169, 173, 159, 174, 157, 62, 53, 26.02, 181; 410/26, 3, 4, 7; 135/88.13, 88.14, 88.15, 88.16, 88.17, 88.18; 52/66

(56) References Cited

U.S. PATENT DOCUMENTS

| | | | |
|---|---|---|---|
| 2,640,721 A | | 6/1953 | Kors |
| 2,957,482 A | | 10/1960 | Tomek |
| 3,032,369 A | | 5/1962 | Fischer |
| 3,352,596 A | * | 11/1967 | Escoto ........................ 296/169 |
| 3,429,608 A | * | 2/1969 | Farnum ....................... 296/173 |
| 3,582,131 A | * | 6/1971 | Brown ....................... 296/26.02 |
| 3,583,755 A | * | 6/1971 | Hedrick ....................... 296/170 |
| 3,596,416 A | * | 8/1971 | Hojka .......................... 296/173 |
| 3,623,765 A | * | 11/1971 | Bowen .......................... 296/53 |
| 3,652,122 A | * | 3/1972 | Beauregard .................. 296/169 |
| 3,737,190 A | * | 6/1973 | Smith et al. ................. 296/159 |
| 3,756,648 A | * | 9/1973 | Greif ........................... 296/157 |
| 3,866,722 A | | 2/1975 | Gardner |
| 3,902,613 A | * | 9/1975 | Newland ........................ 410/3 |
| 3,933,112 A | * | 1/1976 | Veazey ...................... 440/12.58 |
| 4,014,586 A | * | 3/1977 | Swofford ..................... 296/169 |
| 4,057,284 A | | 11/1977 | Blank |
| 4,068,772 A | * | 1/1978 | Prudhomme ................. 414/477 |
| 4,113,301 A | * | 9/1978 | Olmstead ..................... 296/169 |
| 4,149,748 A | * | 4/1979 | Tanner ........................ 280/789 |
| 4,165,117 A | | 8/1979 | Kaiser |
| 4,444,429 A | * | 4/1984 | Dawes ......................... 296/170 |
| 4,749,317 A | * | 6/1988 | Daniel .......................... 410/26 |
| 5,299,849 A | * | 4/1994 | Cook et al. ............. 296/100.15 |
| 5,375,902 A | | 12/1994 | Church |
| 5,462,330 A | * | 10/1995 | Brown ......................... 296/172 |
| 5,722,712 A | * | 3/1998 | Pollen ......................... 135/132 |
| 5,988,731 A | * | 11/1999 | Eischen ....................... 296/159 |
| 6,017,081 A | * | 1/2000 | Colby .......................... 296/173 |
| 6,283,537 B1 | * | 9/2001 | DeVore, III ................. 296/181 |

* cited by examiner

Primary Examiner—Brian L. Johnson
Assistant Examiner—Hau Phan
(74) Attorney, Agent, or Firm—Knobbe, Martens, Olson & Bear, LLP

(57) ABSTRACT

An expandable trailer for recreational use includes hinged sidewalls that are capable of moving between a storage configuration and a deployed configuration. In the storage configuration, a reinforced storage surface is available to support heavy cargo, such as a personal watercraft, an off-road vehicle, or a snowmobile. In the deployed configuration, an enclosed living quarters is available for camping and stowing smaller pieces of cargo. A tent assembly may be erected upon the expandable trailer when the hinged sidewalls are in the deployed configuration. The expandable trailer is adapted to be towed behind a car, light truck, jeep, or other automobile.

35 Claims, 10 Drawing Sheets

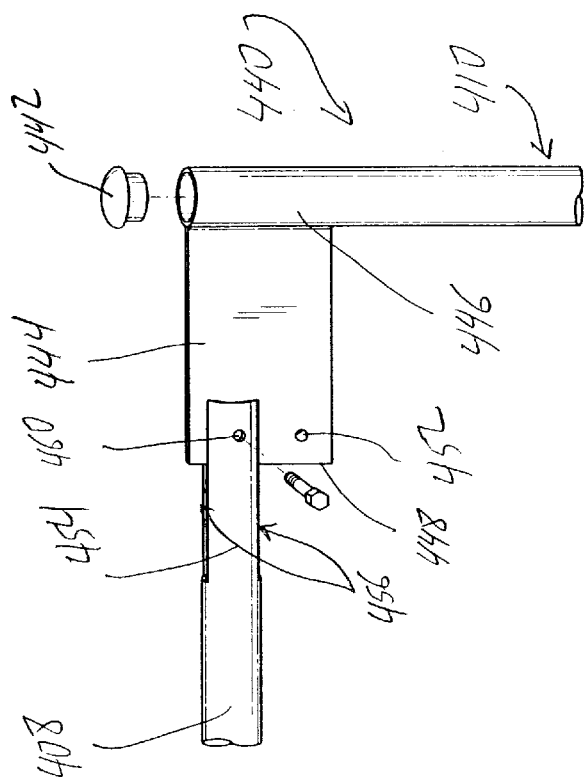
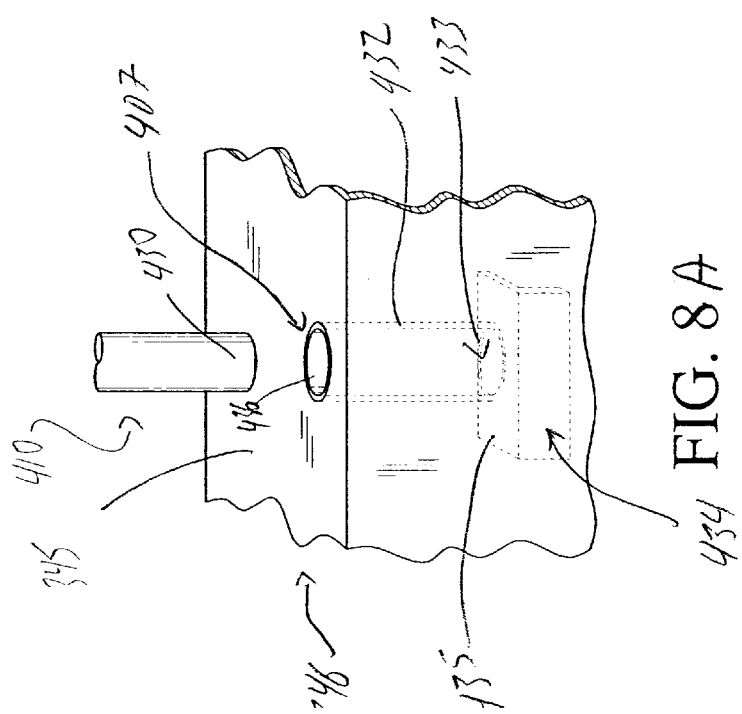
FIG. 8B
FIG. 8A

EXPANDABLE TRAILER

BACKGROUND OF THE INVENTION

1. Field of the Invention

The present invention relates to an expandable trailer adapted for use as an enclosed storage compartment, a living quarters, and a tow bed.

2. Description of the Related Art

Many conventional trailer devices are presently available to consumers for use with their recreational activities. Such devices are commonly adapted to be towed by an automobile such as a car, light truck, or jeep. These devices may be adapted for a variety of uses, such as for providing an equipment storage container, or for providing an enclosed living quarters. Conventional trailer devices allow consumers to enjoy some of the benefits of owning a recreational vehicle—greater storage capacity and the presence of a living quarters—without sacrificing the mobility of an automobile or light truck.

Trailer devices are often used to enhance the capacities of one's automobile or light truck during recreational activities. For example, on a vacation, one might wish to transport off-road vehicles to a remote area, transport personal watercraft to a lake or seashore, or transport snowmobiles to the mountains. Such an excursion will also often involve camping in a remote or undeveloped area to which it may be necessary to pack supplies and provisions for an extended stay. In such situations, it is desirable to be able to carry both heavy machinery (i.e., an off-road vehicle, a personal watercraft, or a snowmobile) and provisions to the location of the recreational activity. Thus, a trailer device that is capable of being towed by an automobile, supporting heavy loads, and functioning as a mobile living quarters is desired.

One example of a conventional trailer device attempting to satisfy these requirements is disclosed in U.S. Pat. No. 3,032,369 to Fischer, entitled "Expandable Trailer House." This device features a compact, covered trailer bed chassis inside which may be stowed a disassembled metal frame and an ordinary flexible tent cover. When the user wishes to construct a living quarters from the trailer, such as upon reaching a campsite, the metal frame is removed from the trailer bed, and is assembled using the trailer bed chassis as a base. Once the metal frame is erected, it may be covered with the flexible tent, thereby providing an enclosed living quarters. Additional furnishings, such as a plurality of sleeping pads, may be added to the interior of the living quarters to enhance the utility and comfort thereof.

While the conventional trailer device disclosed by Fischer provides a convenient way to construct a living quarters, the design suffers numerous disadvantages. First, because the disassembled metal frame and the flexible tent cover must be stowed within the trailer bed, there is limited storage space available for stowing additional cargo. Additionally, because the flexible tent cover is supported only by the metal frame, the tent is likely to have reduced stability, especially in windy or otherwise inclement weather. Finally, the Fischer design cannot be easily adapted for use as a tow bed, because the trailer bed cover must be adapted for easy removal, and is not configured to support heavy loads. Therefore, a more sturdy and spacious trailer device is desired.

Another typical conventional trailer device is disclosed in U.S. Pat. No. 4,165,117 to Kaiser, entitled "Collapsible Camping Trailer." Like the trailer device disclosed by Fischer, the Kaiser device is capable of being transformed into an enclosed living quarters. However, the Kaiser device features hinged rigid front, rear, and side walls, as well as a rigid roof element. These rigid wall and roof elements all fold down into the trailer bed during storage and transportation of the trailer, and all fold upwards and/or outwards to define an enclosed living quarters when the trailer is expanded for use as a camping device. Thus, as compared to Fischer, the Kaiser configuration provides additional stability and storage space.

Despite these advantages, however, the Kaiser configuration also suffers numerous disadvantages. Like the Fischer trailer, the Kaiser trailer is incapable of carrying heavy loads on its exterior roof surface. Although heavy loads may be carried within the Kaiser trailer, the placement of heavy loads within the trailer enclosure will substantially preclude that enclosure from being used for storage of additional cargo. In addition, the storage enclosure of the Kaiser trailer cannot be accessed without opening the entire trailer, an arrangement which may cause substantial inconvenience. Finally, the walls of the Kaiser trailer are not insulated, diminishing the utility of the trailer as a living quarters during especially cold or otherwise inclement weather. Therefore, a sturdy trailer capable of simultaneously carrying heavy objects and bulky (large volume) objects is desired.

SUMMARY OF THE INVENTION

The expandable trailer disclosed herein addresses these needs explained above. This expandable trailer is capable of being folded open and shut like the Kaiser configuration, but it is also capable of carrying heavy objects thereon. In addition, the expandable trailer disclosed herein has exterior access doors through which the interior storage compartments of the trailer may be accessed without unfolding the entire trailer. Finally, this expandable trailer has rigid exterior walls which are insulated, thereby providing additional utility in especially windy, cold, or otherwise inclement weather.

In view of the foregoing, one aspect of the present invention is to provide an expandable trailer capable of carrying heavy cargo (such as a snowmobile, a personal watercraft, an off-road vehicle, or large amounts of heavy equipment), capable of carrying smaller cargo items within an enclosed storage compartment, and capable of providing an enclosed living quarters. In this aspect, the expandable trailer has a chassis with a plurality of wheels, thereby permitting rolling movement along a surface. The expandable trailer also has a main body attached to the chassis, the main body including a floor, two sidewalls, a front wall, and a rear wall, thereby defining an enclosed interior compartment. The expandable trailer also has two hinged sidewall members that are attached to the sidewalls of the main body. The hinged sidewall members are capable of moving between a storage configuration and a deployed configuration. In the storage configuration, the two hinged sidewall members are substantially co-planar, and engage with each other to define a reinforced storage surface. In the deployed configuration, the two hinged sidewall members extend upward from the sidewalls of the main body, thereby further defining an enclosed living quarters. A tent assembly is also provided, the tent assembly adapted to be mounted upon the expandable trailer when the hinged sidewalls are in the deployed configuration.

Another aspect of the present invention is an expandable trailer with hinged sidewall members that, when folded down so they are substantially parallel to the ground, define a reinforced storage surface. The reinforced storage surface is approximately the same size as the main body of the expandable trailer, and is capable of supporting heavy cargo such as a snowmobile, a personal watercraft, an off-road vehicle or heavy equipment. The reinforced storage surface may be partially supported by at least one surface that protrudes from the main body of the expandable trailer. The reinforced storage surface may also be partially supported by reinforcing members on the ends of the hinged sidewall members that engage with each other when the hinged sidewall members are in the storage configuration. The reinforced storage surface may also be supported by a vertical support column, which forms a part of one of the hinged sidewall members. In such a configuration, the vertical support column is adapted to contact the floor of the main body when the hinged sidewall members are in the storage configuration. The reinforced storage surface may further comprise devices adapted to assist in the placement of heavy cargo thereon, such as a retaining lip around the perimeter, or tie-down receptacles adapted to receive a rope, chain, or other device which may be used to secure heavy cargo on the reinforced storage surface.

Yet another aspect of the present invention is an enclosed living quarters. When the hinged sidewall members are in the deployed configuration, a tent assembly may be erected upon the expandable trailer. The tent assembly includes a rigid tent frame and a flexible tent surface which may be deployed to cover the tent frame. The flexible tent cover may also be securably attached to the deployed hinged sidewall members, thereby providing support for the tent assembly in especially windy or otherwise inclement weather. The sidewalls of the main body, as well as the hinged sidewall members, may further comprise an air gap over which the flexible tent cover may be deployed, thereby providing insulation to retain heat within the enclosed living quarters during especially cold or otherwise inclement weather. The interior of the enclosed living quarters may be outfitted with various living accessories, such as beds, counter surfaces, seats, or drawers. In one configuration, the beds may form an interior portion of the hinged sidewall members, thereby exposing a sleeping surface when the hinged sidewall members are moved to the deployed configuration.

The foregoing aspects of the present invention address the shortcomings of presently available conventional trailer devices. The reinforced storage surface allows heavy cargo to be towed, while the interior storage compartment allows smaller cargo items to be carried as well. The hinged sidewall members and the tent assembly provide an enclosed living quarters which is protected from the elements. These features are useful for those who desire to bring heavy cargo and camping provisions for an extended stay to a campsite without necessitating the use of separate trailer devices for towing and camping, and without necessitating the use of a less convenient conventional recreational vehicle.

BRIEF DESCRIPTION OF THE DRAWINGS

FIGS. 8A–8E are partial perspective views of portions of the frame of the tent assembly of the recreational trailer of FIG. 1 and illustrate the structure of the frame of the tent assembly and how it is attached to the body of the recreational trailer.

DETAILED DESCRIPTION OF THE PREFERRED EMBODIMENT

Figure 1:
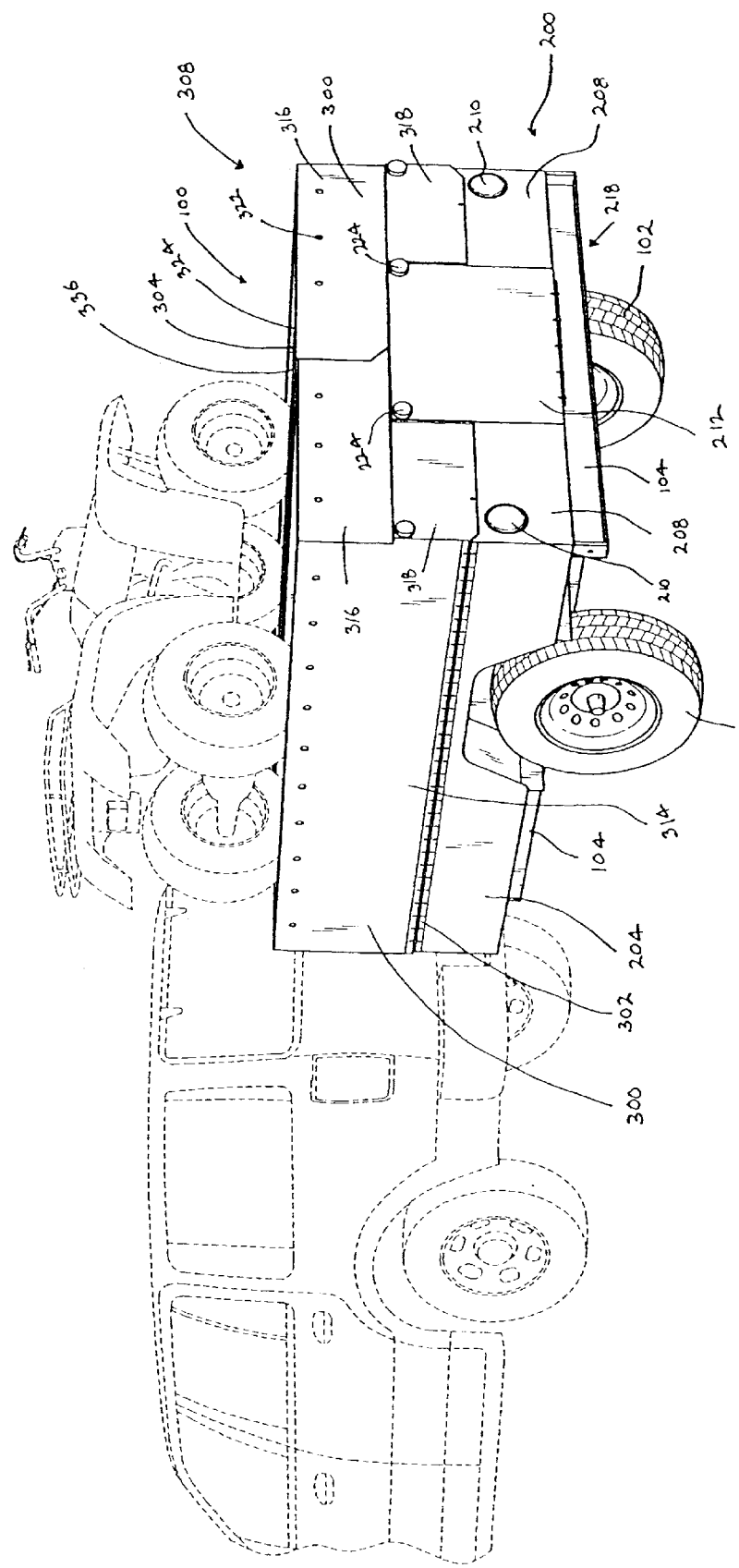
FIG. 1 is a perspective view of an expandable trailer for recreational use in a closed configuration according to one embodiment of the present invention.
Figure 2:
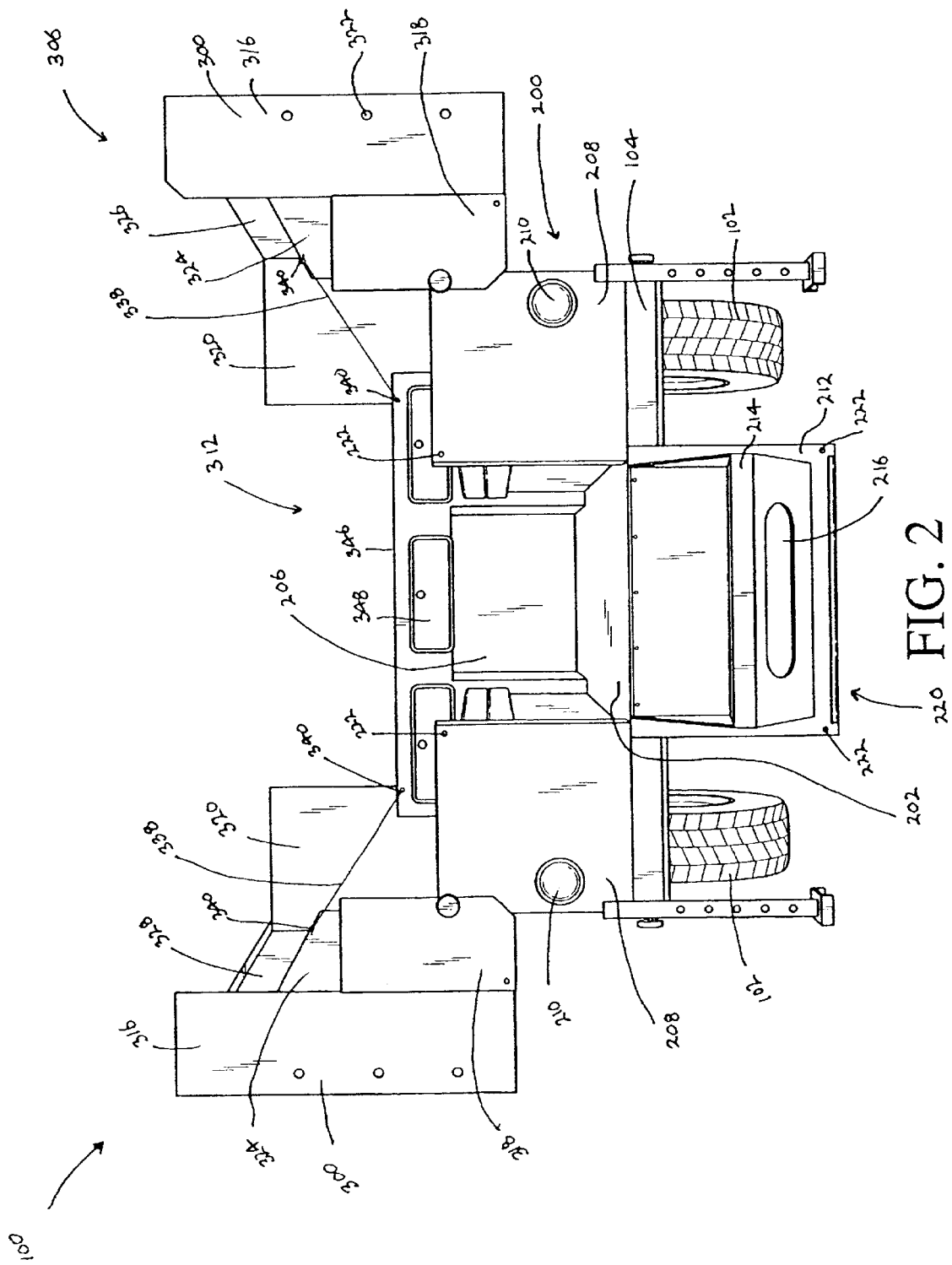
FIG. 2 is a rear view of an expandable trailer for recreational use in an open configuration according to one embodiment of the present invention.
Figure 3:
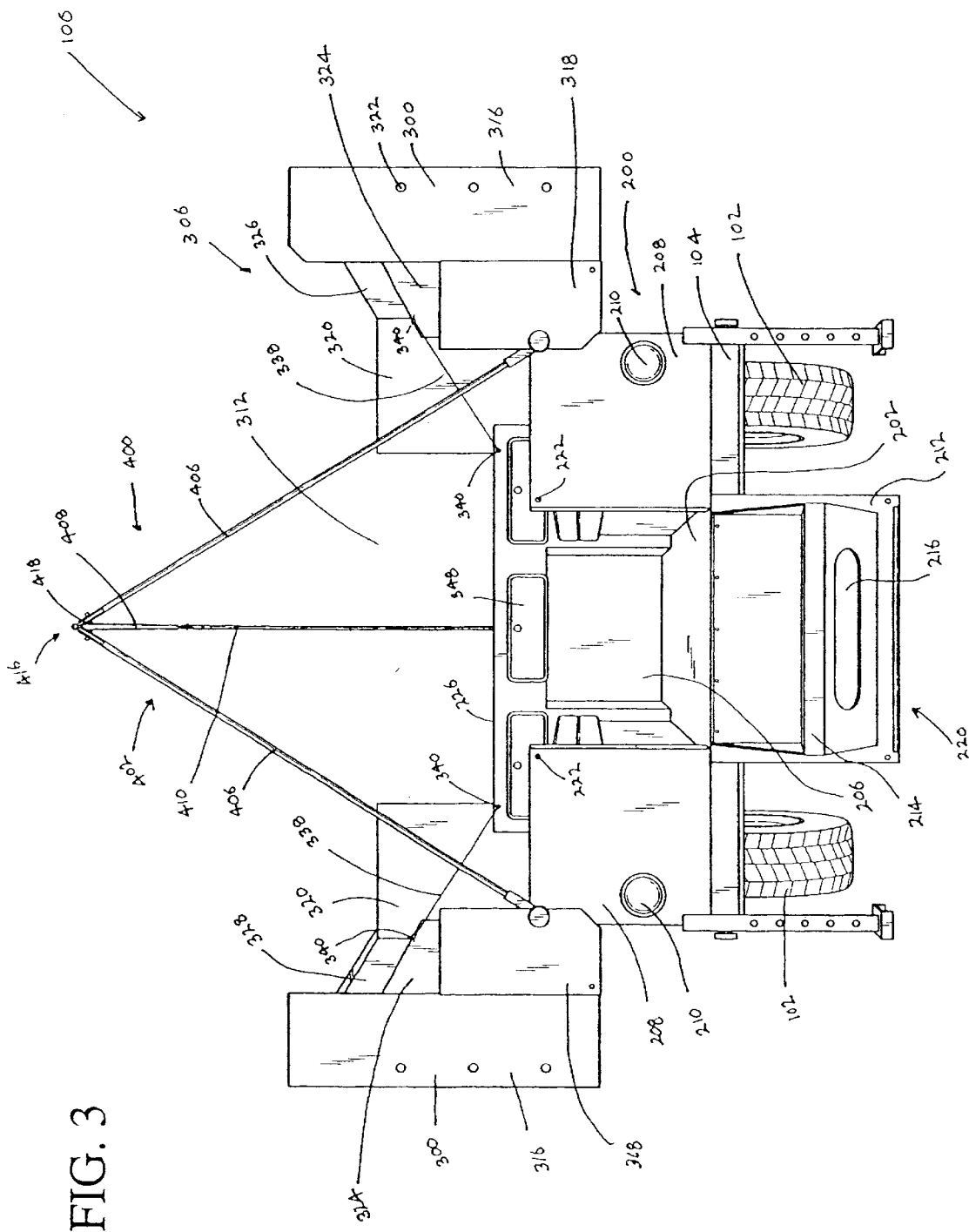
FIG. 3 is a rear view of an expandable trailer for recreational use with a deployed tent assembly according to one embodiment of the present invention.
Figure 4:
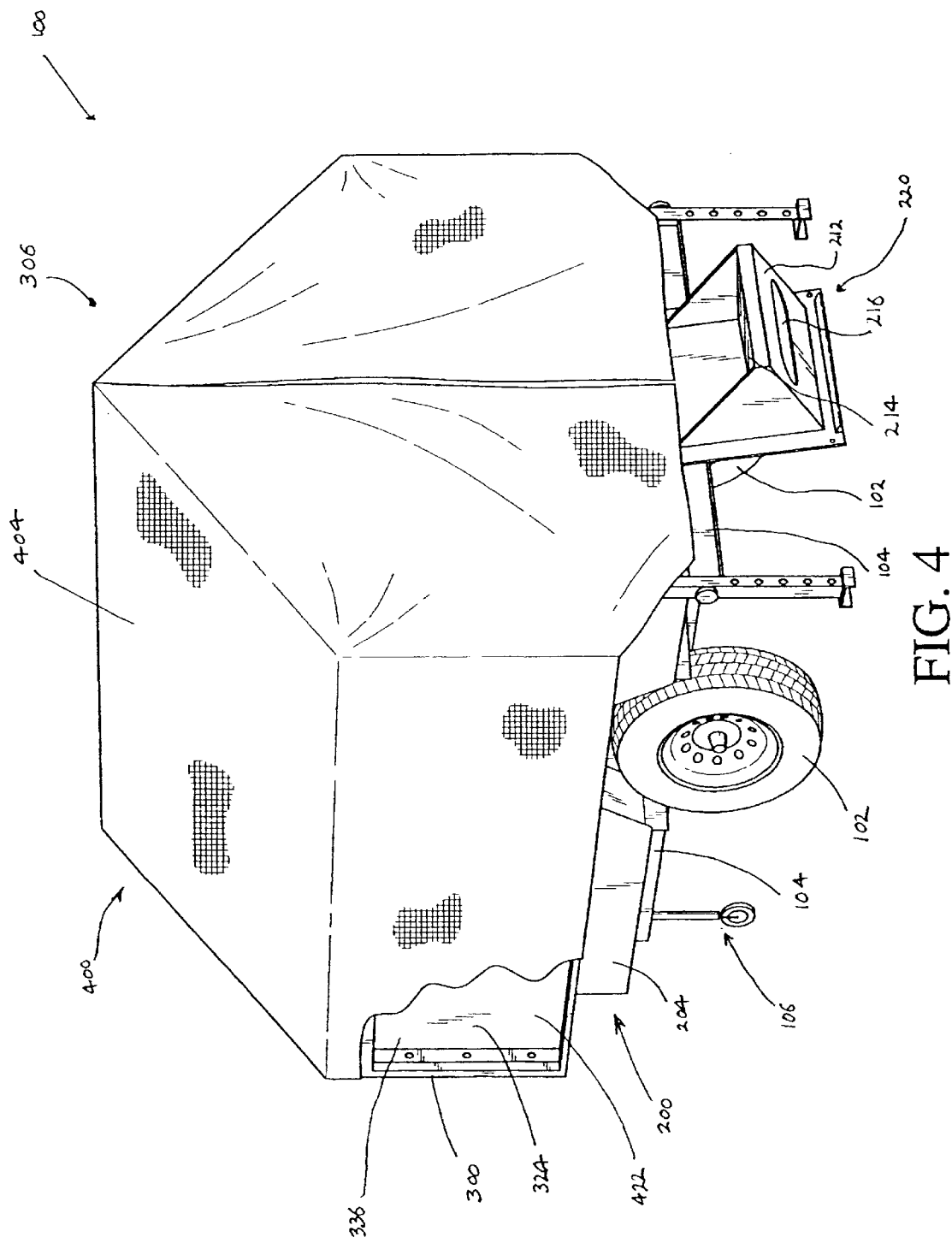
FIG. 4 is a perspective view of an expandable trailer for recreational use with a deployed tent assembly according to one embodiment of the present invention.

As illustrated in FIGS. 1 and 2, one embodiment of an expandable trailer 100 for recreational use comprises a chassis 104 adapted to support a main body 200. The chassis 104 includes a plurality of wheels 102 and an axle (not shown), thereby permitting rolling movement along a surface. The main body 200 is attached to the chassis 104, and includes two sidewalls 204, a front wall 206, a rear wall 208 and a floor 202 (FIG. 2), which, as a group, partially define an enclosed living quarters 312 and an interior storage compartment 310. The expandable trailer 100 further comprises hinged sidewall members 300 which are attached to the sidewalls 204 with hinges 302. The hinges 302 permit movement of the hinged sidewall members 300 between a storage configuration 308 (illustrated in FIG. 1) and a deployed configuration 306 (illustrated in FIG. 2). In the storage configuration 308, the roof portions 324 of the hinged sidewall members 300 are positioned substantially co-planar with each other, and engage with each other to form an exterior reinforced storage surface 304 and an interior storage compartment 310. In the deployed configuration 306, the hinged sidewall members 300 extend upward from the sidewalls 204, partially defining an enclosed living quarters 312. As illustrated in FIGS. 3 and 4, the expandable trailer 100 further comprises a tent assembly 400 that can be mounted to the main body 200 when the hinged sidewall members 300 are in the deployed configuration 306, thereby further defining the enclosed living quarters 312.

In certain embodiments, the chassis 104 comprises a conventional one-axle trailer chassis. Preferably, the chassis 104 features a heavy duty, high-clearance suspension capable of handling off-road conditions and other rough, unpaved surfaces. For example, in one embodiment, the chassis 104 may comprise a rubber torsion axle rated at 3500 pounds. The chassis preferably comprises a trailer hitch (not shown) adapted to allow the expandable trailer 100 to be towed by a vehicle (as illustrated in FIG. 1), or to be freestanding, supported by a height-adjustable support wheel 106 (as illustrated in FIG. 4). However, in alternative embodiments, the chassis 104 may comprise a plurality of axles to support heavier loads or larger expandable trailers. The wheels 102 should also be capable of handling rugged, off-road conditions, and preferably are large enough to provide the expandable trailer 100 with sufficient ground clearance to handle the rough, unpaved conditions that one is likely to encounter in remote and undeveloped locations where camping and other outdoor recreational activities often occur.

As illustrated in FIGS. 1 and 2, the chassis 104 and wheels 102 support the main body 200 of the expandable trailer 100.

The main body 200 includes two sidewalls 204, a front wall 206, a rear wall 208, and a floor 202, which partially define an enclosed living quarters 312 and interior storage compartment 310. The sidewalls 204, front wall 206, rear wall 208 and floor 202 are preferably comprised of a rigid, heavy-duty material capable of supporting heavy loads, such as steel or aluminum. The sidewalls 204, front wall 206, rear wall 208 and floor 202 are preferably secured to each other, and secured to the underlying chassis 104, by welding, although any type of fastening mechanism, such as rivets or bolts, may be used to fasten these components together. In one embodiment, the rear wall 208 includes two electrical receptacles 210 adapted to house lights, such as brake lights, which may be required by an applicable motor vehicle code.

As further illustrated in FIGS. 1 and 2, in certain embodiments the rear wall 208 further comprises a hinged access tailgate 212 adapted to provide access to the enclosed living quarters 312 or the interior storage compartment 310. In such embodiments, the hinged access tailgate 212 may be moved between an upright configuration 218 (illustrated in FIG. 1) and a lowered configuration 220 (illustrated in FIG. 2). In the upright configuration 218, the hinged access tailgate 212 is adapted to further define and enclose the enclosed living quarters 312 or the interior storage compartment 310, functioning to prevent stowed items from falling out of the interior storage compartment 310, and to further isolate the enclosed living quarters 312 from the external environment. The hinged access tailgate 212 may be secured in the upright configuration 218 by inserting a tailgate fastener 224, such as a bolt, a pin or a locking device, in the tailgate securing holes 222. In the lowered configuration 220, the hinged access tailgate 212 is adapted to provide access to the enclosed living quarters 312 or the interior storage compartment 310.

As illustrated in FIG. 2, in an alternative embodiment, the hinged access tailgate 212 further comprises a step assembly 214 adapted to further facilitate access to the enclosed living quarters 312 when the hinged access tailgate 212 is in the lowered configuration 220. In such embodiments, the step assembly 214 also comprises a storage container 216 which is adapted for easy access from the enclosed living quarters 312 when the hinged access tailgate 212 is in the upright configuration 218.

As illustrated in FIGS. 1 and 2, in certain embodiments, the hinged sidewall members 300 each further comprise side portions 314, rear upper portions 316, rear lower portions 318, front portions 320 and roof portions 324. The hinged sidewall members 300 are preferably comprised of a rigid, heavy-duty material capable of supporting heavy loads, such as steel or aluminum. The side portions 314, rear upper portions 316, rear lower portions 318, front portions 320 and roof portions 324 are preferably secured to each other by welding, although any type of fastening mechanism, such as rivets or bolts, may be used to fasten these components together. In alternative embodiments, the side portions 314, the rear upper portions 316 and the front portions 320 further comprise tie-down anchor holes 322 and/or a retaining lip 334 adapted to secure cargo on the reinforced storage surface 304. The holes 322 also provide drainage for the upper surface to inhibit accumulations of water. The use of a retaining lip 334 to secure cargo on the reinforced storage surface 304 provides a recessed region 336 of the reinforced storage surface.

The hinged sidewall members 300 are affixed to the sidewalls 204 via the hinge 302, thereby allowing the hinged sidewall members 300 to move between the storage configuration 308 (illustrated in FIG. 1) and the deployed configuration 306 (illustrated in FIG. 2). In the storage configuration 308, the hinged sidewall members 300 are folded down such that the side portions 314 are substantially parallel to the sidewalls 204, and such that the roof portions 324 of the two hinged sidewall members 300 are substantially coplanar. This configuration produces a reinforced storage surface 304 on the upper exterior surface of the expandable trailer 100 that is capable of supporting heavy cargo, such as a snowmobile, an off-road vehicle, or a personal watercraft. Such heavy cargo will be referred to hereinafter as "personal recreational vehicles." This configuration also provides an interior storage compartment 310 that may be accessed through the hinged access tailgate 212, and that may be used for stowing smaller cargo items that need to be protected from the external environment. In certain embodiments, the dimensions of the reinforced storage surface 304 are substantially equal to the dimensions of the floor 202 of the main body 200.

In other embodiments, when the hinged sidewall members 300 are in the storage configuration 308, the reinforced storage surface 304 is structurally supported by protruding surfaces 226 on the front wall 206 and the rear wall 208 of the main body 200. See FIG. 6. This configuration allows the hinged access tailgate 212 to be opened—and the interior storage compartment 310 to be accessed—while the hinged sidewall members 300 are in the storage configuration 308 and while the reinforced storage surface 304 is supporting a heavy load.

Figure 5:
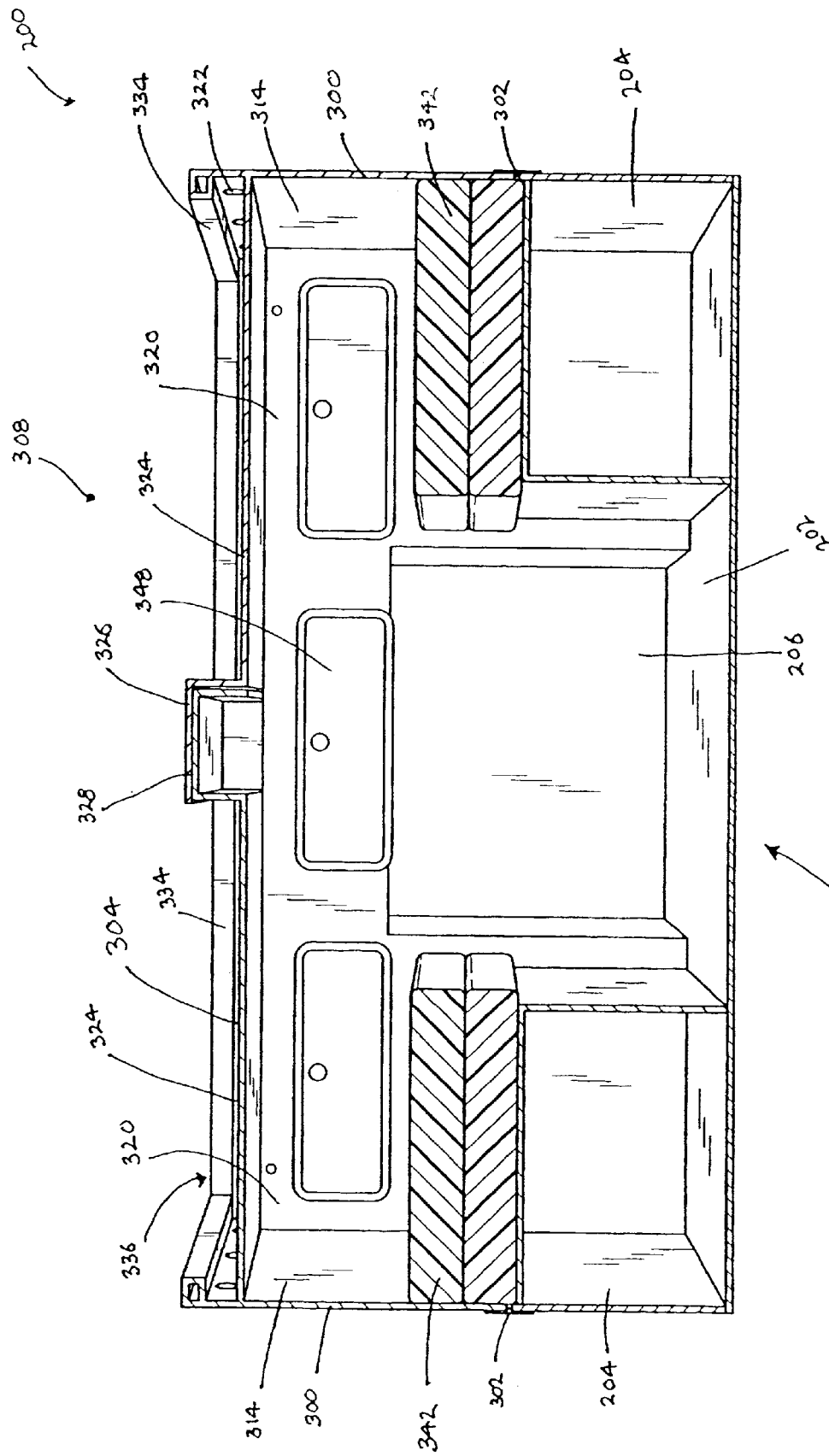
FIG. 5 is a cutaway rear view of an expandable trailer for recreational use in a closed configuration according to one embodiment of the present invention.

In alternative embodiments, the hinged sidewall members 300 have reinforcing members that engage with each other when the hinged sidewall members 300 are in the storage configuration 308. Preferably, such reinforcing members are located at the distal ends of the hinged sidewall members 300, opposite from the hinge 302. For example, as illustrated in FIG. 5, one of the hinged sidewall members 300 further comprises an L-shaped reinforcing member 326, while the other hinged sidewall member 300 further comprises a C-shaped reinforcing member 328. In such a configuration, when the hinged sidewall members 300 are in the storage configuration 308, the L-shaped reinforcing member 326 engages on top of the C-shaped reinforcing member 328, thereby providing further structural support to the reinforced storage surface 304.

More specifically, when the hinged sidewall members 300 are in the storage configuration 308 and a load is placed on the reinforced storage surface 304, the roof portions 324 of the hinged sidewall members 300 act as a lever arm, creating a torque around the hinge 302. Absent any other forces, this torque would cause the hinged sidewall members 300 to rotate down and into the interior storage compartment 310. However, the presence of the engaging reinforcing members 326, 328 distribute the load applied on the reinforced storage surface 304 to the front and rear regions of the roof portions 324 of the hinged sidewall members 300. Such a distribution of the forces is advantageous because when the hinged sidewall members 300 are in the storage configuration 308, the front and rear regions of the roof portions 324 are supported. More specifically, at the front of the expandable trailer 100, the roof portions 324 of the hinged sidewall members 300 rest directly upon the protruding surface 226, which is in turn directly supported by the chassis 104. Likewise, at the rear of the expandable trailer 100, the reinforcing members 326, 328 distribute the load to the rear upper portions 316 of the hinged sidewall members 300. The rear upper portions 316 rest directly upon the protruding surfaces 226 of the rear walls 208, which are also directly supported by the chassis 104.

Additionally, the above-described engagement of the reinforcing members 326, 328 provides the further advantage of preventing moisture, dirt, or other unwanted substances from entering the interior storage compartment 310. This configuration allows the expandable trailer 100 to be used simultaneously for stowing and transporting cargo that is preferably sheltered from external environmental conditions and for stowing and transporting cargo that can be exposed to external environmental conditions, such as personal recreational vehicles.

Figure 7:
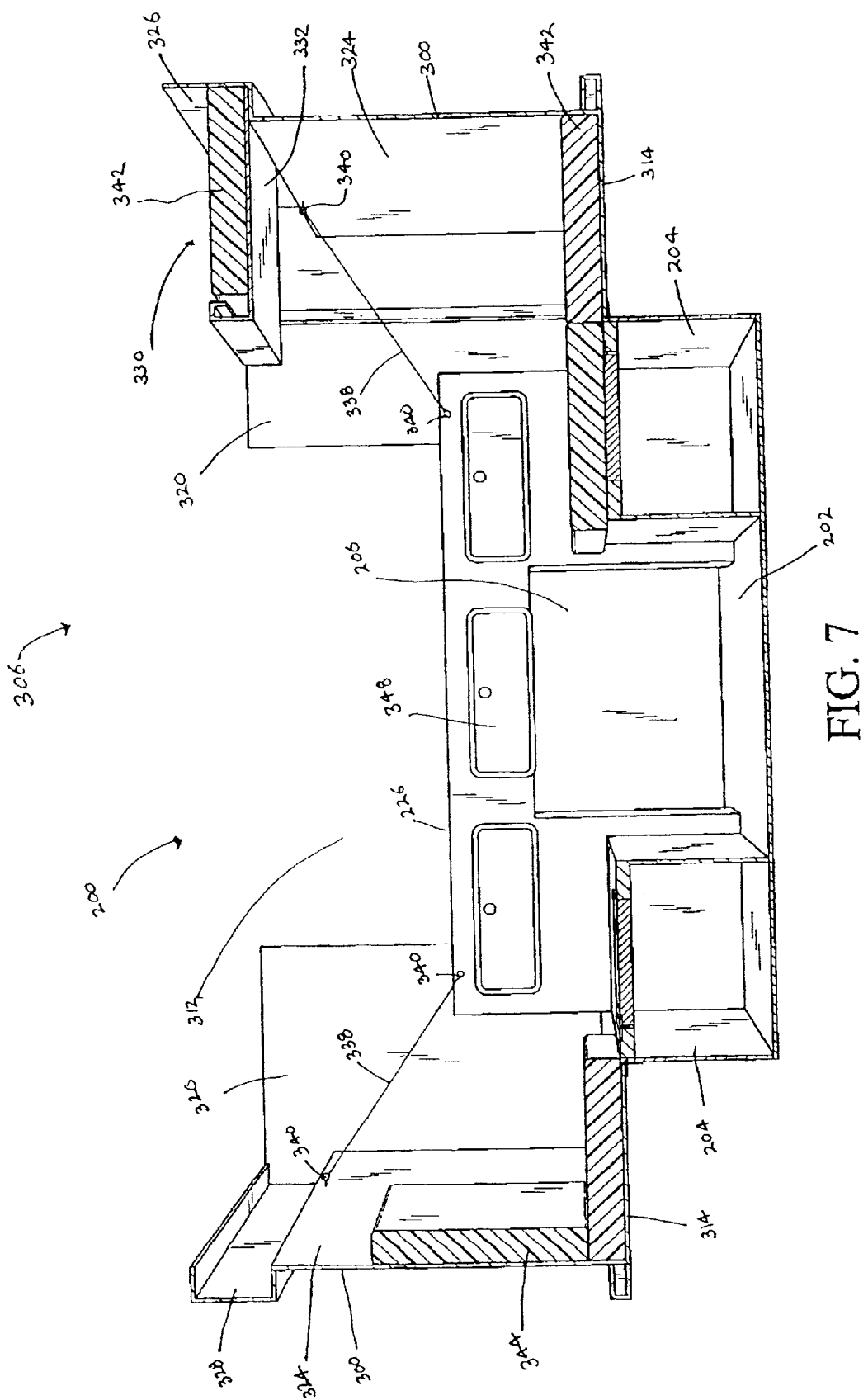
FIG. 7 is a rear view of the opened living quarters according to an alternative embodiment of the present invention.

As illustrated in FIG. 7, in certain embodiments one of the hinged sidewall members 300 further comprises an upper bunk rack 330. The upper bank rack 330 is adapted to contact the floor 202 of the main body 200 when the hinged sidewall member 300 is in the storage configuration 308, thereby further functioning as an elongated vertical support column 332 that runs along substantially the entire length of the interior storage compartment 310. The vertical support post 332 further supports the reinforced storage surface 304.

FIGS. 2 and 3 illustrate the hinged sidewall members 300 in the deployed configuration 306, wherein the roof portions 324 of the hinged sidewall members 300 are substantially perpendicular to the ground. Placement of the hinged sidewall members 300 in the deployed configuration 306 further defines the enclosed living quarters 312. In alternative embodiments, the hinged sidewall members 300 are further supported in the deployed configuration 306 by support members 338 which are held in tension in the deployed configuration 306. The support members 338 preferably comprise high-strength flexible steel cables, although any other structural member capable of supporting a load in tension may be used, such as a hydraulic arm or a folding member. The support members 338 are fastened to the front wall 206 of the main body 200 and to one of the interior sides of the hinged sidewall members 300 using a pin 340, although other any fastening device, such as a screw or bolt, may also be used.

Figure 6:
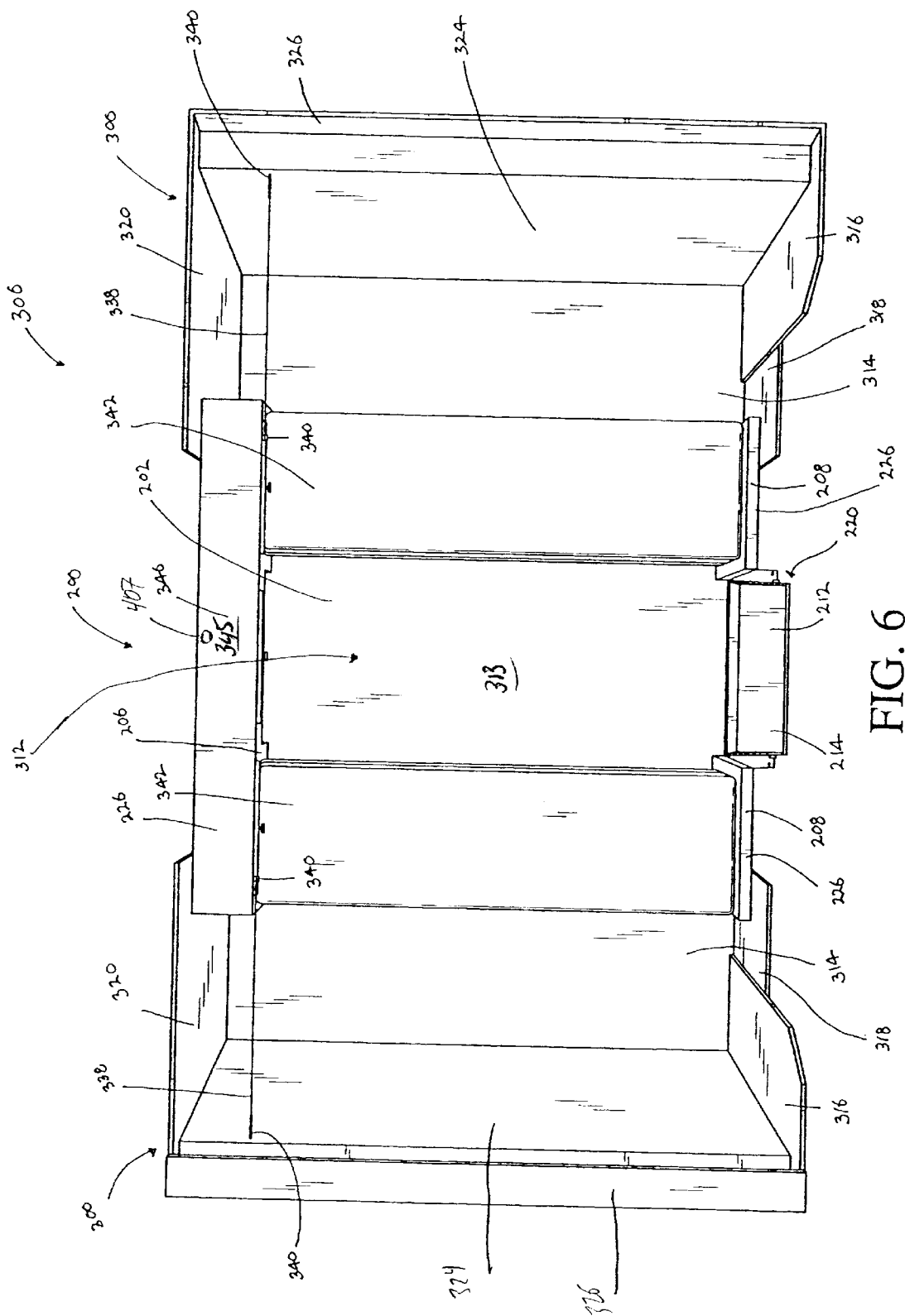
FIG. 6 is an overhead view of an expandable trailer for recreational use in an open configuration according to one embodiment of the present invention.

As illustrated in FIGS. 2, 6 and 7, which contain various illustrations of the expandable trailer 100 in the deployed configuration, one of ordinary skill in the art will recognize that a virtually unlimited variety of interior furnishings may be placed within the enclosed living quarters 312. Examples of such furnishings include beds 342, padded seats 344, countertops 346 and small storage compartments 348. Selection of appropriate furnishings may be made based on the intended use of the expandable trailer 100.

More specifically, referring to FIGS. 6 and 7, one floor plan of the trailer 100 is illustrated. In this floor plan, the enclosed living portion 312 includes a floor 313 that extends substantially along the longitudinal length of the trailer 100. The beds 342 are formed so as to extend upwards from the floor 313 to a desired height and the beds also extend substantially along the entire longitudinal length of the trailer 100. The side portions 314, in the deployed configuration shown in FIG. 6, extend outward so as to further form a portion of the bed sections 342.

As is also shown in FIGS. 6 and 7, the front end of the trailer includes a front shelf 345 which defines the countertops 346. The shelf 345 extends upward from the floor 313 and defines a surface that can be used for storage and can also accommodate cooking equipment and heating equipment. As is also illustrated in FIG. 6, the shelf 345 includes an opening 347 that is adapted to accommodate a portion of the frame 402 of the tent assembly 400 in the manner that will be described in greater detail below in reference to FIG. 8A.

As illustrated in FIGS. 3 and 4, the expandable trailer 100 further comprises a tent assembly 400. In certain embodiments, the tent assembly 400 further comprises a tent frame 402 and a flexible tent surface 404. In such embodiments, the tent frame 402 comprises two rear upright support members 406, a ridge pole member 408, and a front vertical support member 410. The tent frame 402 is adapted to support the flexible tent surface 404, thereby further defining the enclosed living quarters 312.

Figure 8D:
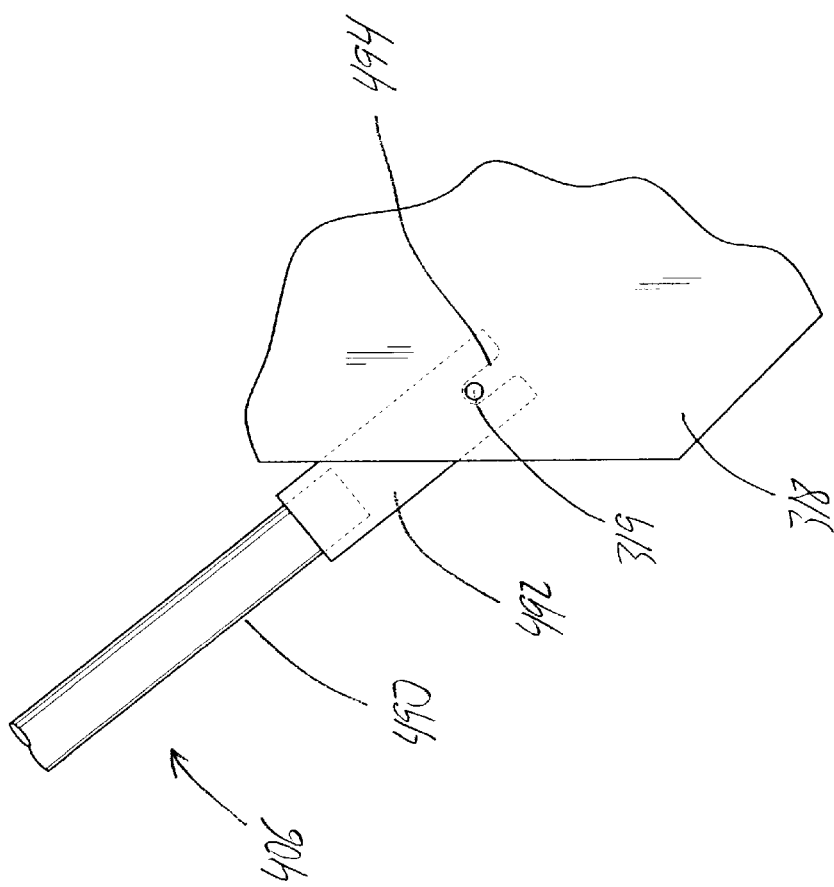

FIGS. 8A–8E illustrate the various components of the tent frame 402 and the manner in which they are attached to the trailer 100 when the trailer 100 is in the deployed configuration. As is illustrated in FIG. 8A, the front pole 408 of the tent frame 402 is positioned within an opening 407 that is formed in the surface 345 of the counter top 346. As is illustrated in FIG. 6, the opening 407 is preferably positioned at or about the central axis of the body of the trailer at a point immediately adjacent the front wall 206 of the main body 200 of the trailer 100.

Referring to FIG. 8A, a bottom end 430 of the front vertical support member 410 is positioned within a receiver 432 that is mounted to a support 434 that is attached to the front wall of the body of the trailer. The support 434 is in this embodiment an L-shaped pieced of material that is coupled to an inside surface of the front wall 206 of the main body 200 of the trailer 100. An upper surface 435 provides a support surface for a lower end 433 of the receiver 432. The receiver 432 is preferably a hollow cylindrical member, such as a pipe, that defines an elongate opening 436 that has a diameter slightly greater than the diameter of the bottom end 430 of the front vertical support member 410 such that the front vertical support member 410 is flushly positioned within the opening 436. Further, the opening 436 has a length that is preferably selected such that a substantial enough portion of the front vertical support member 410 is positioned within the opening 436 to inhibit the member 410 from being removed by wind action and the like.

FIG. 8B illustrates an upper end 440 of the front vertical support member 410. The upper end 440 preferably includes a cap 442 that inhibits the entry of water into the interior of the front vertical support member 410 which, to conserve weight, is hollow. A front hinge member 444 is attached to an outer surface 446 of the front vertical support member 410 so as to extend outward from the outer surface 446. In one embodiment, the front hinge member 444 is welded to the outer surface 446 of the upper end 440 of the front vertical support member 410.

The front hinge member 444 is preferably planar and, in this embodiment, is generally rectangular in shape having an outer end 448. The front hinge member 444 includes a ridge pole attachment opening 450 and an auxiliary opening 452 formed adjacent the top and bottom edges respectively of the outer end 448 of the front hinge member 444. As is illustrated in FIG. 8B, the ridge pole 408 includes a slot 456 formed adjacent the front end 454 of the ridge pole 408 that is sized so as to receive the front hinge member 444. Moreover, two hinge bolt openings 460 (one shown) are formed in the front end 454 of the ridge pole 408 such that a hinge bolt 462 can be extended through the hinge bolt openings 460 of the ridge pole 408 and the ridge pole attachment opening 450 in the front hinge member 444 to hingedly attach the ridge pole to the front pole member 410. As is also illustrated, the hinge member 444 includes the auxiliary opening 452 that is adapted to hang equipment, such as lanterns and the like, in the interior of the tent assembly 400.

Figure 8C:
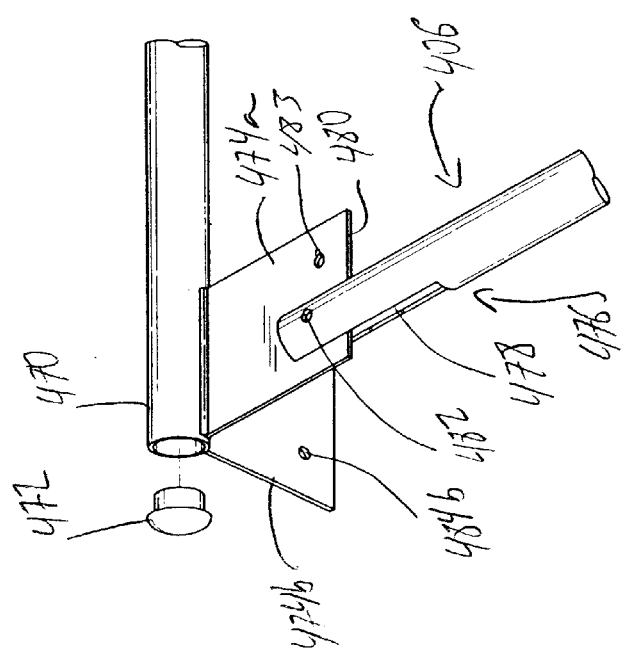
Figure 8E:
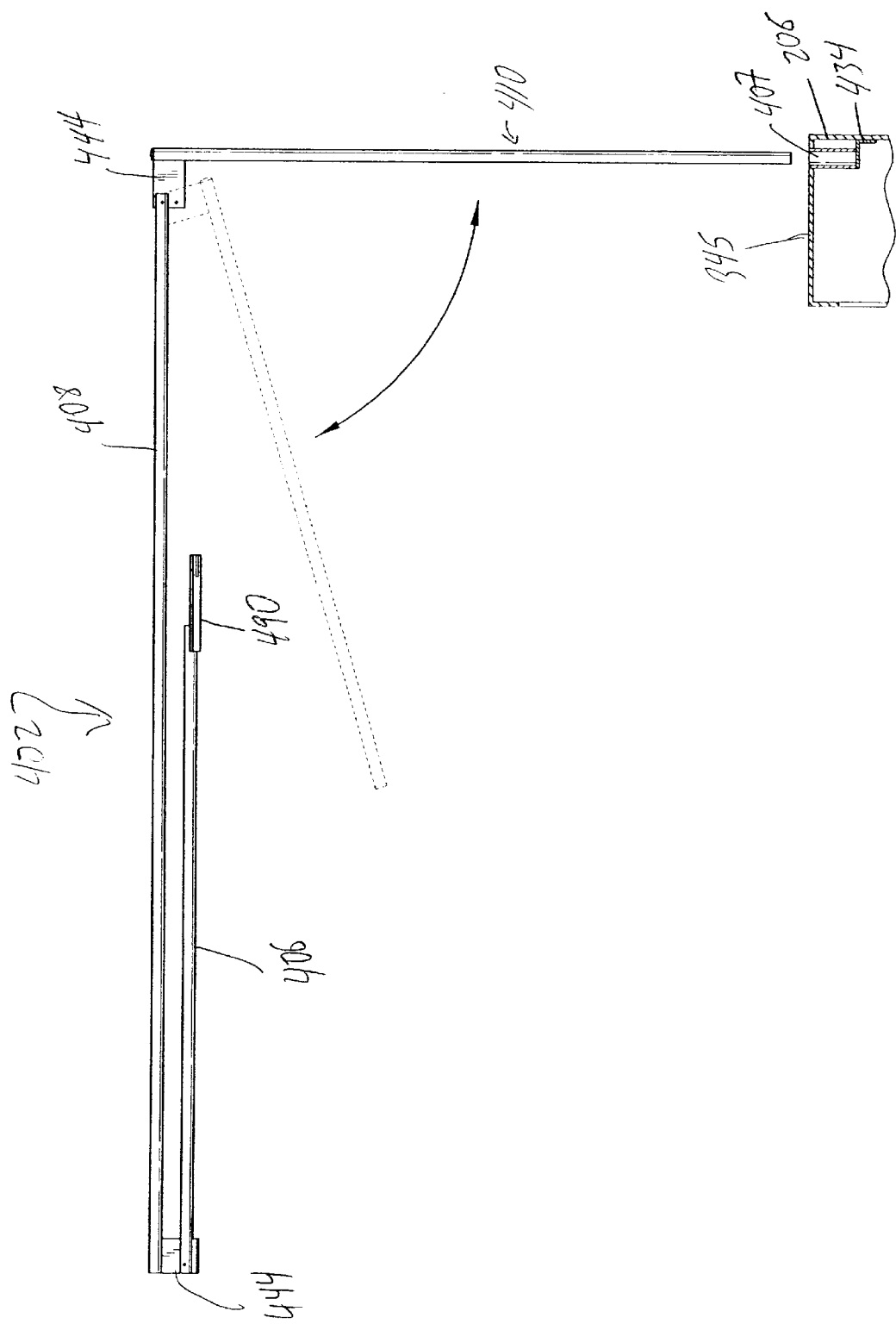

FIG. 8C illustrates a rear end 470 of the ridge pole member 408. The rear end 470 includes a cap 472 that covers the end in the manner shown. As is also shown, two rear hinge members 474 are fixedly attached, preferably through welding, to the rear end 470 of the ridge pole member 408 so as to extend outward at angles selected so that the rear support members 406 define a triangular shaped profile shown in FIG. 3 when attached to the ridge pole 408 and the main body 200 of the trailer 100 in the manner described below. The upper ends 476 of the rear support members 406 include slots 478 that receive the outer edge 480 of the rear hinge member 474a, 474b in substantially the same manner as described above. The upper ends 476 of the rear support member 406 include a hinge opening 482 and a mating mounting opening 484 that are formed in the rear hinge members 474a, 474b in a similar manner as described above. The hinge openings 482 and the mounting openings 484a, 484b receive a hinge pin or bolt such that the rear support members 406a, 406b can be hingeably attached to the ridge pole member 408. As is also shown in FIG. 8C, the rear hinge plates 474a, 474b, also include an auxiliary hole 483 that is adapted to permit hanging of equipment, such as lanterns and the like in the interior of the tent assembly 400.

FIG. 8D illustrates the manner in which a lower end 490 of the rear support members are attached to the main body 200 of the trailer 100. As is shown in FIG. 8D, the lower end 490 of the rear support members 406 are threadably connected to a mounting collar 492 that includes an opening 494 formed at the outer end 496 of the mounting collar 492. The opening 494 is dimensioned to receive the fastener 319 that secures the rear lower portions 318 into the upper configuration shown in FIG. 3.

Hence, the tent frame 402 is mounted adjacent the front end 206 of the trailer 100 via the front support member 410 and is mounted adjacent the rear end 208 of the trailer via the two angled rear support members 406a, 406b. The tent canvas can then be positioned on the frame 402 to thereby complete the tent covering. Advantageously, the tent frame is hingedly connected together to allow it to be collapsed into the generally aligned configuration shown in FIG. 8E.

More specifically, the front support member 410 can be pivoted about the hinge plate 444 so as to be positioned parallel to the ridge pole 408 and, similarly, the rear support members 406a, 406b can be pivoted about the hinge plates 444a, 444b respectively to also be positioned parallel to the ridge pole 408. This results in the frame assembly 402 being positioned in a compact orientation that permits the frame to be stored within the main section 200 of the trailer 100 during travelling. To install the tent frame, the front support member 410 has to be unfolded and positioned into the hole 407 in the counter 346 and the rear member has to be positioned about fasteners 319. Hence, both storage and installation of the tent frame is greatly simplified in this embodiment of the trailer.

In a preferred embodiment, the tent frame 402 may be comprised of aluminum rods, although any other rigid material capable of supporting the flexible tent surface 404 may be used. In an alternative embodiment, the tent frame 402 may be comprised of smaller segments that may be disassembled into smaller rods, thereby facilitating storage of the tent frame 402.

In certain embodiments, the flexible tent surface 404 is disposed over the erected tent frame 402 and over the hinged sidewall members 300 which have been moved to the deployed configuration 306. In such embodiments, the flexible tent surface 404 may be secured to the hinged sidewall members 300 and the main body 200 of the expandable trailer 100 via snaps (not shown) or any other fastening mechanism. Such a configuration allows the enclosed living quarters 312 to be substantially isolated from any inclement weather, such as precipitation or wind, which may be present in the external environment. In alternative embodiments, as illustrated in FIG. 4, the recessed region 336 of the hinged sidewall members 300 provides an insulating air gap 422 between the interior surface of the hinged sidewall members 300 and the flexible tent surface 404. The presence of an insulating air gap 422 provides further isolation of the enclosed living quarters 312 from any exterior inclement weather, such as low temperatures. In other embodiments, the front wall 206 and the rear wall 208 of the main body 200 further comprise an insulating air gap 422 to provide additional thermal insulation to the enclosed living quarters 312.

The various embodiments of the expandable trailer 100 described above provide numerous advantages over conventional trailers. The presence of the reinforced storage surface 304 allows heavy cargo to be towed, while the interior storage compartment 310 provides a large storage region for smaller items that should be carried in an enclosed compartment not exposed to the elements. In addition, the hinged sidewall members 300 allow the expandable trailer 100 to be easily transformed by one person into an enclosed living quarters 312. This configuration is especially well suited for recreational excursions to remote areas, where one wishes to bring heavy cargo, as well as provisions and shelter for an extended stay. The expandable trailer 100 provides the features and capacities of a conventional recreational vehicle without sacrificing the convenience and mobility of an automobile, light truck or jeep.

Although the above described embodiments of the present invention have described, illustrated, and characterized the fundamental novel features of the invention as applied to those embodiments, it will be understood that various omissions, substitutions, and changes in the form of the detail of the device represented may be made by those skilled in the art without departing from the spirit of the present invention. Consequently, the scope of the invention should not be limited to the foregoing description but is to be defined by the appended claims.

What is claimed is:

1. An expandable trailer comprising:

a chassis having a plurality of wheels to permit rolling movement along a surface;

a main body attached to the chassis, wherein the main body defines an enclosed interior compartment and wherein the main body includes first and second sidewalls, a front wall, a rear wall and a floor, and wherein the main body further includes at least one protruding surface that extends inward from at least one of the front or rear walls in a direction substantially perpendicular to the front or rear walls;

first and second hinged sidewall members that are hingeably attached to the first and second sidewalls of the main body respectively, wherein the first and second hinged sidewall members are movable between a storage configuration where the first and second hinged sidewall members are positioned substantially co-planar with each other and wherein the first and second hinged sidewall members engage with each other in the storage configuration so as to define a reinforced storage surface with a reinforcing structure extending substantially perpendicular to the front and rear walls of the main body so as to structurally engage with the at least one protruding surface, and a deployed configuration, where the first and second hinged sidewall members extend upward from the first and second sidewalls of the main body such that the first and second sidewalls of the main body and the first and second hinged sidewall members define the enclosed interior compartment of the expandable trailer; and a tent assembly that mounts to the main body of the expandable trailer when the first and second hinged sidewall members are in the deployed configuration so as to further define the enclosed interior compartment of the expandable trailer.

2. The expandable trailer of claim 1, wherein the reinforced storage surface has dimensions that are substantially equal to the dimensions of the floor of the main body.

3. The expandable trailer of claim 2, wherein the reinforced storage surface is sized so as to receive a personal recreational vehicle.

4. The expandable trailer of claim 3, wherein the personal recreational vehicle is an off-road vehicle.

5. The expandable trailer of claim 2, wherein the main body includes at least one protruding surface that extends inward from one of the front or rear walls and wherein the first and second hinged sidewall members are structurally supported by the at least one protruding surface to thereby provide structural support for the reinforced storage surface.

6. The expandable trailer of claim 5, wherein:

each of the first and second hinged sidewall members have a distal end opposite the hinged attachment to the sidewalls of the main body; and first and second reinforcing members are formed on the distal ends of the first and second hinged sidewall members, respectively, to provide structural support for the reinforced storage surface.

7. The expandable trailer of claim 6, wherein:

the first reinforcing member comprises a C-shaped member;

the second reinforcing member comprises a L-shaped member; and the first and second reinforcing members engage with each other when the first and second hinged sidewall members are in the storage configuration, thereby reinforcing the reinforced storage structure.

8. The expandable trailer of claim 7, wherein the second hinged sidewall member further comprises a vertical support column adapted to contact the floor when in the storage configuration.

9. The expandable trailer of claim 7, wherein the L-shaped member sits over the C-shaped member in the storage configuration.

10. The expandable trailer of claim 1, wherein the tent assembly further comprises a tent frame adapted to support a tent surface.

11. The expandable trailer of claim 10, wherein:

the main body further comprises at least one support post; and the tent frame comprises at least one upright support member which is securely attached to the support post.

12. The expandable trailer of claim 10, wherein an insulating gap exists between the main body of the expandable trailer and the tent surface.

13. The expandable trailer of claim 10, wherein an insulating gap exists between the first and second sidewalls of the expandable trailer and the tent surface.

14. The expandable trailer of claim 1, wherein the reinforced storage surface further comprises at least one securing receptacle and a retaining lip, each adapted to secure an object placed upon the reinforced storage surface.

15. The expandable trailer of claim 1, wherein each of the first and second hinged sidewall members are supported in the deployed configuration by at least one sidewall support that is securely attached to the first or second hinged sidewall member and the main body.

16. An expandable trailer comprising:

a chassis having a plurality of wheels to permit rolling movement along a surface;

a main body attached to the chassis, wherein the main body defines an enclosed interior compartment, and wherein the main body includes first and second sidewalls, a front wall, a rear wall and a floor, and wherein the main body further includes at least one protruding surface that extends inward from at least one of the front or rear walls in a direction substantially perpendicular to the front or rear walls; and first and second hinged sidewall members that are hingeably attached to the first and second sidewalls of the main body respectively, wherein:

the first and second hinged sidewall members are movable between a storage configuration and a deployed configuration; and the first and second hinged sidewall members each further comprise an external surface and an internal surface; such that:

when the first and second hinged sidewall members are in the storage configuration the external surfaces of the first and second hinged sidewall members define a reinforced external storage surface with a reinforcing structure extending substantially perpendicular to the front and rear walls of the main body so as to structurally engage with the at least one protruding surface, and the internal surfaces of the first and second hinged sidewall members define an enclosed storage compartment; and when the first and second hinged sidewall members are in the deployed configuration, the external surfaces of the first and second hinged sidewall members support a tent assembly, and the internal surfaces of the first and second hinged sidewall members define an enclosed living quarters.

17. The expandable trailer of claim 16, wherein said tent assembly further comprises a tent frame adapted to support a flexible tent surface disposed over the main body of the expandable trailer.

18. The expandable trailer of claim 16, wherein:

the main body further comprises at least one support post; and the tent frame comprises at least one upright support member which is securely attached to the support post.

19. The expandable trailer of claim 18, wherein an insulating gap exists between the main body and the tent surface.

20. The expandable trailer of claim 16, wherein the main body further comprises support receptacles adapted to support the tent frame.

21. The expandable trailer of claim 16, wherein the reinforced storage surface has dimensions that are substantially equal to the dimensions of the floor of the main body.

22. The expandable trailer of claim 21, wherein the reinforced storage surface is sized so as to receive a personal recreational vehicle.

23. The expandable trailer of claim 22, wherein the personal recreational vehicle is an off-road vehicle.

24. The expandable trailer of claim 21, wherein the main body includes at least one protruding surface that extends inward from one of the front or rear walls and wherein the first and second hinged sidewall members are structurally supported by the at least one protruding surface to thereby provide structural support for the reinforced storage surface.

25. The expandable trailer of claim 24, further comprising a first and second reinforcing members that are formed on the first and second hinged sidewall members, respectively, to provide structural support for the reinforced storage surface.

26. The expandable trailer of claim 25, wherein:

the first reinforcing member comprises a C-shaped member;

the second reinforcing member comprises a L-shaped member; and the first and second reinforcing members engage with each other when the first and second hinged sidewall members are in the storage configuration, thereby reinforcing the reinforced storage structure.

27. The expandable trailer of claim 26, wherein the second hinged sidewall member further comprises a vertical support column adapted to contact the floor when in the storage configuration.

28. The expandable trailer of claim 26, wherein the L-shaped member sits over the C-shaped member in the storage configuration.

29. The expandable trailer of claim 16, wherein the reinforced storage surface further comprises at least one securing receptacle and a retaining lip, each adapted to secure an object placed upon the reinforced storage surface.

30. The expandable trailer of claim 16, wherein each of the first and second hinged sidewall members are supported in the deployed configuration by at least one sidewall support that is securably attached to the first or second hinged sidewall member and the main body.

31. An expandable trailer comprising:

a chassis having a plurality of wheels to permit rolling movement along a surface;

a main body attached to the chassis, wherein the main body defines an enclosed interior compartment and wherein the main body includes a first and second sidewalls, a front wall, a rear wall and a floor, and wherein the main body further includes at least one protruding surface that extends inward from at least one of the front or rear walls in a direction substantially perpendicular to the front or rear walls;

first and second hinged sidewall members that are hingeably attached to the first and second sidewalls of the main body respectively, wherein the first and second hinged sidewall members are movable between a storage configuration where the first and second hinged sidewall members are positioned substantially co-planar with each other and wherein the first and second hinged sidewall members engage with each other in the storage configuration so as to define a reinforced storage surface with a reinforcing structure extending substantially perpendicular to the front and rear walls of the main body so as to structurally engage with the at least one protruding surface, and a deployed configuration, where the first and second hinged sidewall members extend upward from the first and second sidewalls of the main body such that the first and second sidewalls of the main body and the first and second hinged sidewall members define the enclosed interior compartment of the expandable trailer; and a tailgate that is hingeably attached to the main body, wherein the tailgate is movable between an upright configuration where the tailgate further defines the enclosed interior compartment and a lowered configuration where the tailgate provides access to the enclosed interior compartment.

32. The expandable trailer of claim 31, wherein the tailgate further comprises at least one footstep adapted to allow a person to enter the enclosed interior compartment when the tailgate is in the lowered configuration.

33. The expandable trailer of claim 31, wherein the tailgate further comprises a recessed storage compartment adapted to be accessed from within the enclosed interior compartment when the tailgate is in the upright configuration.

34. The expandable trailer of claim 31, wherein the tailgate is adapted to partially support a load placed upon the reinforced storage surface.

35. The expandable trailer of claim 31, wherein the tailgate is adapted to be moved between the upright configuration and the lowered configuration when a load is placed upon the reinforced storage surface.

* * * * *